PROCESS FOR THE PRODUCTION OF ALDEHYDES

Georges Mignonac and Pierre Jules André Bourbon, Toulouse, France, assignors to Compagnie Francaise des Matieres Colorantes, Paris, France, a French company No Drawing. Filed Apr. 11, 1958, Ser. No. 727,800

Claims priority, application France Apr. 12, 1957

2 Claims. (Cl. 260—297)

The present invention concerns a new process for the production of aldehydes.

The aldehydes of the pyridine series have not been studied much up to the present, principally because a practical method for their preparation was not known. The first method used to obtain α-pyridine-aldehyde consisted in condensing the iodomethylate of α-picoline with p-nitrosodimethylaniline, hydrolysing the condensation product and decomposing by heat into aldehyde and methyl iodide the product resulting from this hydrolysis. In 1918, Harries and Lenart obtained pyridine-aldehydes by ozonisation of stibazole and benzoylmetanicotine. Oxidation of the picolines is only able to give traces of aldehydes. Finally, P. Wibaut has obtained the acetals of the pyridine-aldehydes by condensation of the magnesium bromopyridines with ethyl ortho-formate; their hydrolysis gives the aldehydes and the maximum yields obtained are 30%. The preparation of β-pyridine-aldehyde by splitting of the benzenesulphonylhydrazide of nicotinic acid and by application of the Stevens reaction to β-pyridine nitrile has also been described without an appreciable improvement of the yields being recorded.

Following work on the catalytic hydrogenation of nitriles, it has been shown by the inventors that the intermediate imine was the origin of the secondary reactions. In some cases the presence of the non-isolatable imine has been revealed by its hydrolysis and its transformation into aldehyde, but here it was only a question of a method of formation of the aldehydes and not of a practical method for their manufacture.

According to the present invention, it has now been found that the aldehydes of the pyridine series and indeed aldehydes generally can be obtained with excellent yields by catalytic hydrogenation of the corresponding nitriles and hydrolysis of the intermediate imines at the same rate as they are formed.

This condition is realised, for example, by proceeding with the catalytic hydrogenation in the presence of an aqueous phase maintained at an acid pH. The preferred pH is between 2 and 5. The usual hydrogenation catalysts may be used as catalyst, but it has been found that catalysts based on common metals, such as nickel, can be employed in a medium at pH 2, acidified, for example, by means of sulphuric acid. Other acids such as, for example, oxalic acid or benzene-sulphonic acid may be used in place of the sulphuric acid.

As stated above, this method of preparation of aldehydes, which constitutes probably the best method known at present for the pyridine series, can be generalised and used in other series when the starting nitrile is a cheap and readily accessible raw material. For example, by this method benzaldehyde can be obtained from benzonitrile, and benzene ortho-dialdehyde from ortho-phthalodinitrile.

The following examples, in which the parts given are parts by weight unless the contrary is indicated, are purely illustrative and not meant to restrict the invention.

Example 1

50 parts of β-pyridine nitrile are dissolved in 850 parts of water. 70 parts of 66° Bé. sulphuric acid and 10 parts of reduced nickel catalyst are added; the whole is kept under a pressure of hydrogen slightly above atmospheric pressure and at a temperature of 45° C. On agitation, the hydrogen is absorbed, and the introduction of hydrogen is continued until 10,770 parts by volume of this gas (volume brought to 0° C. and 760 mms. pressure) have been absorbed. At the end of the operation, the pH is 2. The pH is taken to 7.5 and the aldehyde is entrained in steam in an inert atmosphere (nitrogen, for example). The distillate can be used just as it is for a subsequent conversion of the β-pyridine aldehyde obtained; for example, by passing the distillate into an aqueous solution of the hydrazide of isonicotinic acid, 80 parts of the compound

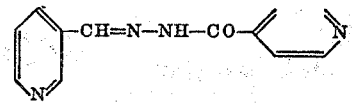

are obtained.

Example 2

25 parts of β-pyridine nitrile are dissolved in 450 parts of water; 20 parts of oxalic acid and 5 parts of reduced nickel are added. The operation is carried out with 5,385 parts by volume of hydrogen under the same conditions as those of Example 1. The pH, which is 2.5 at the start of the operation, alters to 5 at the end thereof. The pH is then taken to 7.5 and the aldehyde is separated by entraining in stream or by extraction with solvents (for example ether or chloroform). The β-pyridine-aldehyde is obtained with a yield of about 70%.

Example 3

12.8 parts of orthophthalodinitrile, 800 parts of 95% alcohol, 300 parts of water, 13 parts of 66° Bé. sulphuric acid and 10 parts of reduced nickel catalyst are treated with hydrogen at 22° C. and with agitation. The hydrogenation is slower than in the foregoing examples. The pH, which is 2 at the start of the operation, is still 2 at the end of the operation. Benzene ortho-dialdehyde is obtained with a good yield by extraction with solvents, such as for example ether or chloroform.

Example 4

50 parts of benzonitrile are added to 850 parts of water, and 70 parts of 66° Bé. sulphuric acid and 10 parts of reduced nickel catalyst are added. The whole is maintained under a pressure of hydrogen slightly above atmospheric pressure and at a temperature of 45° C. The hydrogen is absorbed on agitation; the introduction of hydrogen is continued until 10,770 parts by volume of this gas (volume brought to 0° C. and 760 mms. pressure) have been absorbed. The pH is taken to 7.5, and the aldehyde is entrained in steam and decanted. The benzoic aldehyde is obtained with a yield of 75% to 80%.

We claim:

1. Process for the preparation of an aldehyde selected from the group consisting of pyridine aldehyde, benzaldehyde and benzene ortho-dialdehyde which comprises subjecting the corresponding nitrile to hydrogenation in the presence of an aqueous phase maintained at an acid pH and in the presence of a nickel-containing catalyst.

2. Process as claimed in claim 1 in which the pH is maintained from about 2 to about 5 by sulphuric acid.

(References on following page)

References Cited in the file of this patent

UNITED STATES PATENTS 2,749,351     Mathes et al.  ------------- June 5, 1956

OTHER REFERENCES

Stephen: J. Chem. Soc., vol. 127, pp. 1874–1877 (1925).

Williams: J. Am. Chem. Soc., vol. 61, pp. 2248–2249 (1939).

Migatake et al.: Chem. Abstracts, vol. 47, col. 2177 (1953).

Juday et al.: J. Am. Chem. Soc., vol. 77, pp. 4559–4564 (1955).

Pietra et al.: Chem. Abstracts, vol. 50, p. 10037 (1956).

Mee: Richter's Org. Chem., vol. III, p. 306 (1946).